(12) United States Patent
Nutaro et al.

(10) Patent No.: US 9,372,541 B2
(45) Date of Patent: Jun. 21, 2016

(54) GESTURE RECOGNITION SYSTEM OPERABILITY VERIFICATION

(71) Applicant: HONEYWELL INTERNATIONAL INC., Morristown, NJ (US)

(72) Inventors: Joseph Nutaro, Phoenix, AZ (US); Randy Maner, Albuquerque, NM (US); Steve Grothe, Cave Creek, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 397 days.

(21) Appl. No.: 13/794,335

(22) Filed: Mar. 11, 2013

(65) Prior Publication Data

US 2014/0253428 A1      Sep. 11, 2014

(51) Int. Cl.
*G06F 3/01*      (2006.01)

(52) U.S. Cl.
CPC ..................... *G06F 3/017* (2013.01)

(58) Field of Classification Search
CPC . G06K 9/00355; G06F 3/04883; G06F 3/017; G03B 21/26
See application file for complete search history.

(56) References Cited

U.S. PATENT DOCUMENTS

| 8,180,114 | B2  |    | 5/2012  | Nishihara et al. |     |
|-----------|-----|----|---------|------------------|-----|
| 8,270,670 | B2  | *  | 9/2012  | Chen et al.      | 382/103 |
| 8,539,550 | B1  | *  | 9/2013  | Terres et al.    | 726/2 |
| 8,847,757 | B2  | *  | 9/2014  | Kim et al.       | 340/556 |
| 8,873,841 | B2  | *  | 10/2014 | Yang et al.      | 382/159 |
| 2008/0013793 | A1 |    | 1/2008  | Hillis et al.   |     |
| 2009/0116742 | A1 |    | 5/2009  | Nishihara       |     |
| 2009/0300531 | A1 | *  | 12/2009 | Pryor            | 715/764 |

FOREIGN PATENT DOCUMENTS

DE       102012025564 A1     11/2013

OTHER PUBLICATIONS

EP Search Report for Application No. EP 14157402.0 dated May 21, 2014.
EP Exam Report for Application No. EP 14157402.0 dated Jun. 6, 2014.
Anup Nandy et al; "Recognizing & Interpreting Indian Sign Language Gesture for Human Robot Interaction" IEEE International Conference, Sep. 17, 2010; pp. 712-717, XP031804712.

* cited by examiner

*Primary Examiner* — Abbas Abdulselam
(74) *Attorney, Agent, or Firm* — Ingrassia Fisher & Lorenz, P.C.

(57) ABSTRACT

A gesture recognition system and method verifies the operability of the gesture system by providing a test target that is configured to generate a test stimulus that is recognizable by the gesture recognition system. The test stimulus from the test target is received and processed in the gesture recognition system to generate a test response. The processor verifies that the test response corresponds to the test stimulus.

18 Claims, 1 Drawing Sheet

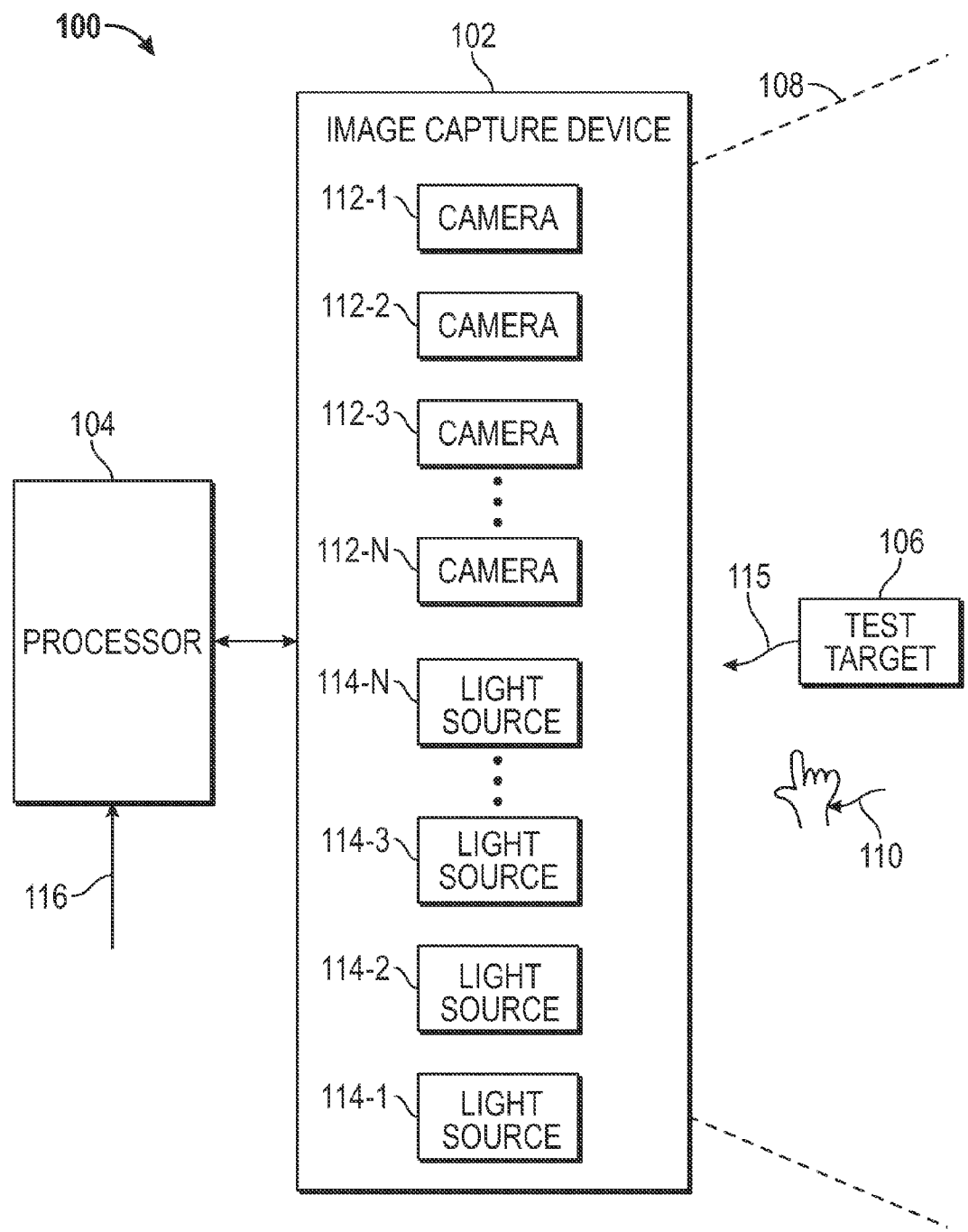

GESTURE RECOGNITION SYSTEM OPERABILITY VERIFICATION

TECHNICAL FIELD

The present invention generally relates to gesture recognition systems, and more particularly relates to a system and method for verifying the operability of a gesture recognition system.

BACKGROUND

The technology used to implement computational device user interfaces is both varied and continually advancing. These technologies run the gamut, and include dedicated hardware interfaces (e.g., keyboard, mouse, etc.), touch screen interfaces, and more recently gesture recognition systems, just to name a few. As is generally known, gesture recognition systems are generally configured to detect movement of an object, such as a part of a human body (e.g., a hand), identify such movement as a particular stimulus (e.g., a gesture), and classify the stimulus as an input to the computational device.

In recent years, aircraft control systems (e.g., avionics systems) have become increasingly electronic and integrated with on-board computers. When combined with recent advances in gesture recognition software and hardware, there is now interest in using gesture commands to control various avionics system functions. Yet, despite these recent advances, presently known gesture recognition systems may not be able to meet the varying levels of hardware and software criticality or the flight crew procedures currently implemented by regulatory authorities that are designed to assure a very high likelihood of error free operability. Assurance that a gesture recognition system is working properly is important especially in special situations where a gesture recognition system or certain gesture sensitivities (e.g. a small depth of motion) may only be used during certain phases of flight or only in specific situations, where prior assurance that the system is operational is highly desirable.

Accordingly, it is desirable to provide a method and system for operating an avionics system having gesture command capability that provides assurances of operation, allows the flight crew to interact in a manner consistent with modern flight deck procedures, and is capable of meeting operability assurance requirements of regulatory authorities. The present invention addresses at least this need.

BRIEF SUMMARY

In one embodiment, a method for verifying the operability of a gesture recognition system includes providing a test target that is configured to generate a test stimulus that is recognizable by the gesture recognition system. The test stimulus from the test target is received and processed in the gesture recognition system to generate a test response. The processor verifies that the test response corresponds to the test stimulus.

In another embodiment, a gesture recognition system includes a gesture recognition device, a test target, and a processor. The gesture recognition device has a field of sensitivity, and is configured to detect movement of objects within the field of sensitivity. The test target is disposed within the field of sensitivity of the gesture recognition device and is configured to generate a test stimulus detectable by the gesture recognition device. The processor is in operable communication with the gesture recognition device, and is configured to detect object stimuli generated by objects within the field of sensitivity and selectively generate system output commands based on the detected object stimuli. The processor is further configured to receive the test stimulus detected by the gesture recognition device, generate a test response based on the test stimulus, and verify that the test response corresponds to the test stimulus.

Furthermore, other desirable features and characteristics of the gesture recognition system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing FIGURES, wherein like numerals denote like elements, and wherein:

FIG. 1 depicts a functional block diagram of one embodiment of a gesture recognition system.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Referring to FIG. 1, a functional block diagram of an embodiment of a gesture recognition system 100 is depicted, and includes a gesture recognition device 102, a processor 104, and a test target 106. The gesture recognition device 102 may be variously configured and implemented, but in the depicted embodiment the gesture recognition device 102 comprises a plurality of cameras 112 (e.g., 112-1, 112-2, 112-3, . . . 112-N) and a plurality of light (e.g., infrared light) sources 114 (114-1, 114-2, 114-3, . . . 114-N). It will be appreciated, however, that the gesture recognition device 102 could be implemented with only one camera 112 and one light source 114, or with one or more cameras 112 and no light sources 114. In the latter case, as may be appreciated, the system 100 may rely on ambient light to provide sufficient illumination. Moreover, the one or more cameras 112 may be variously configured and implemented, as may the one or more light sources 114. No matter its specific implementation, the image capture device 102 has a field of sensitivity 108 (e.g., a field of view), and is configured to capture images of objects 110 within the field of view 108. The objects within the field of view may be a human body, parts of a human body, devices held by a human body, or any one of numerous inanimate objects that can be detected by the image capture device.

The processor 104 is in operable communication with the image capture device 102, and is configured to detect object stimuli generated by objects within the field of view 108. As used herein, the term "object stimuli" refers to movements (e.g., gestures) of one or more objects, reflections off of objects or projected images, or light sources. The processor 104 is additionally configured to selectively generate system output commands based on the detected object stimuli. The system output commands that the processor 104 generates may vary depending upon the end-use environment in which the system 100 is implemented. If, for example, the end-use environment is an aircraft avionics system, the output commands may be commands associated with aircraft and/or cockpit systems and or components. For example, the output commands may be commands to raise or lower landing gear, to move flight control surfaces, to jettison fuel, to turn certain lights on and off, to control the volume of the communications radio, to switch pages being displayed on a cockpit display, just to name a few. The particular commands that are generated are numerous and varied and are based, of course, on the object stimuli (e.g., gesture).

The image capture device 102 and processor 104, and the general operational functionality described herein are not new, and both may be implemented using any one of numerous known gesture recognition system configurations, whether known now or developed in the future. As such, detailed descriptions of these components and the general gesture recognition functions implemented thereby are not needed, and will not be further provided. However, as was previously noted, in the context of certain end-use environments, such as an aircraft, presently known gesture recognition systems do not implement the capability to meet the operability assurance requirements of regulatory authorities. Thus, the components and functions implemented by the system 100 to provide this capability will now be provided.

The operability assurance capability of the gesture recognition system 100 is provided via the test target 106 and additional functionality implemented by the processor 104. The test target 106 is disposed within the field of view 108 of the image capture device 102 and is configured to generate a test stimulus 115 that is detectable by the image capture device 102. The processor 104, in implementing the additional functionality, is further configured to receive the test stimulus detected by the image capture device 102, generate a test response based on the test stimulus, and verify that the test response corresponds to the test stimulus.

It will be appreciated that the test target 106 may be variously configured and implemented, and that the test stimulus generated by the test target 106 may also be variously configured and implemented. For example, the test target 106 may be implemented using one or more non-moving (e.g., fixed) devices or it may be implemented using one or more moving devices. Moreover, the test target 106 may be a dedicated device or component having the sole function of generating the test stimulus, or it may be a device or component that implements other functions in addition to generating the test stimulus. Some non-limiting examples of a non-moving device or component include a pulsing light source, or a reflective object or surface that reflects light. Some non-limiting examples of a moving device or component include a rotating wheel, an oscillating pendulum, a translating mechanism, and an operator-controlled device, such as, for example, an aircraft control surface actuator (e.g., the yoke or wheel on the yoke) in an aircraft cockpit. As may be appreciated, some moving devices or components, such as rotating wheels, oscillating pendulums, and translating mechanisms, may move with a set periodicity, whereas others, such as the operator-controlled device, may move non-periodically (e.g., only when movement thereof is initiated by an operator).

In addition to the variations in configuration and implementation of the test target 106, it will be appreciated that the test response that the processor 104 generates in response to the test stimulus may also vary. For example, in some embodiments the test response may simply be an internal verification that the system 100 recognizes the test target 106, including its relative distance, depth, and various other characteristics. This test response may then be compared to an expected system response to verify that the test response corresponds to the test stimulus.

In other embodiments, such as when the test target 106 is implemented as (or using) an operator-controlled device, the test response may be the detected response of the device or component that is controlled by the operator-controlled device. So, for example, if the operator-controlled device is an aircraft yoke, the expected system response would be the movement of the aircraft flight control surface(s) commanded by the yoke movement. If the processor 104, via, for example, feedback sensors, detects the commanded movement of the aircraft flight control surface(s), then the response is verified to correspond to the test stimulus. Alternatively, the expected system response could be the detected movement of the aircraft as commanded by the yoke movement. Moreover, the position of the control yoke as sensed by the gesture recognition system 100 could also be compared to the position sensors that, at least for a fly-by-wire system, directly sense the movement of the yoke. This would be an even more direct comparison method than the resulting command to the flight control surfaces or the movement of the aircraft. As may be appreciated, many variations are possible, depending upon the operator-controlled device and the devices or components that the operator-controlled device is controlling.

No matter how the test target 106 is implemented and configured, nor how the test response is generated, the processor 104, at least in some embodiments, is further configured to selectively switch the gesture recognition system 100 into an inactive mode. In particular, when processor 104 determines that the test response does not correspond to the test stimulus, it switches the gesture recognition system 100 into the inactive mode. In the inactive mode, the gesture recognition system 100 will no longer be used to selectively generate system output commands based on detected object stimuli. The processor 104, in some embodiments, may also be configured to generate an alert when the gesture recognition system is switched to the inactive mode. The alert may be an audible alert, a visual alert, a tactile alert, or various combinations thereof.

The processor 104 may also be configured to automatically generate the test response at a predetermined periodicity, or to do so in response a prompt from a user. In the latter case, and as FIG. 1 further depicts, the processor 104 is coupled to receive a test initiation signal 116 and is configured, upon receipt thereof, to generate the test response. Typically, however, the periodic automated test response is sufficient to ensure, with relatively high confidence, that the system 100 will be working properly when needed by the user. Although the predetermined periodicity may vary, one example periodicity that may be used is once per minute. In some instances, users themselves may evoke the system 100 for additional confidence. For example, in the context of an aircraft, a user may, just prior to a take-off, when landing gear will be raised via gesture control, evoke the system.

It will be appreciated that the gesture recognition system 100 described above is merely exemplary of one particular implementation and configuration, and that various other configurations may be implemented. For example, the gesture recognition system 100 is not limited to the optic-based system described above. Rather, the gesture recognition system 100 could be configured and implemented as an acoustic-based system or an electric-field-based system, just to name a few. It will be appreciated that with these alternative configurations and implementations, the gesture recognition device 102 may be configured and implemented as an acoustic-based device or as an electric-field-based device, just to name a few. In each case, however, the gesture recognition device 102 may include, for example, one or more sensors 112 (e.g., 112-1, 112-2, 112-3, . . . 112-N), each having a field of sensitivity 108. The gesture recognition device 102 may also include one or more emitters 114 (114-1, 114-2, 114-3, . . . 114-N) configured to generate appropriate stimulus (e.g., acoustic, electric field, etc.). The one or more sensors 112 are each configured to detect the movement of one or more objects within the field of sensitivity 108. As may also be appreciated, the test target 106 and test stimulus 115 generated thereby will vary, depending upon the type of gesture recognition device 102 that is used. For example, if an acoustic-based system is implemented, the test target 106 may generate (if needed) an acoustic test stimulus 115. Similarly, if an electric-field-based system is implemented, the test target 106 may generate (if needed) an electric field test stimulus 115.

The system and method described herein provides a gesture recognition system that is capable of providing assurance of proper system operation, and the capability of meeting operability assurance requirements of regulatory authorities. It should be noted that the processor 104 may be implemented as a single device or as a collection of devices and circuits configured to meet high integrity standards through well-known means, such as two devices monitoring the one or more test targets 106 and comparing to confirm that each is receiving the same stimuli.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for verifying the operability of a gesture recognition system that comprises an image capture device having a field of view, the method comprising the steps of:

providing a test target separate from, and within the field of view of, the image capture device, the test target configured to generate a test stimulus that is recognizable by the gesture recognition system;

receiving, by the image capture device, the test stimulus from the test target;

processing, in a processor, the test stimulus received by the image capture device to generate a test response;

verifying, in the processor, that the test response corresponds to the test stimulus; and inactivating the entire gesture recognition system when the test response does not correspond to the test stimulus, whereby the gesture recognition system no longer generates any system output commands.

2. The method of claim 1, further comprising:
generating an alert when the gesture recognition system is inactivated.

3. The method of claim 1, wherein at least the test stimulus is processed automatically at a predetermined periodicity.

4. The method of claim 1, further comprising:
supplying a test initiation signal; and
processing the test stimulus in response to the test initiation signal.

5. The method of claim 1, wherein:
the test target is configured to move; and
the test stimuli is movement of the test target.

6. The method of claim 5, wherein the test target moves periodically.

7. The method of claim 5, wherein the test target moves non-periodically.

8. The method of claim 1, wherein:
the test target is stationary; and
the test stimulus is an optical stimulus.

9. The method of claim 8, wherein the test stimulus comprises one of light reflections off of the test target and light emissions from the test target.

10. A gesture recognition system, comprising:
a gesture recognition device comprising an image capture device having a field of view, the gesture recognition device configured to sense movement of objects within the field of view;
a test target disposed separate from, and within the field of view of, the gesture recognition device, the test target configured to generate a test stimulus detectable by the gesture recognition device; and
a processor in operable communication with the gesture recognition device, the processor configured to detect object stimuli generated by objects within the field of view and selectively generate system output commands based on the detected object stimuli, the processor further configured to:
receive the test stimulus detected by the gesture recognition device,
generate a test response based on the test stimulus,
verify that the test response corresponds to the test stimulus, and
switch the entire gesture recognition system into an inactive mode when the test response does not correspond to the test stimulus, whereby the gesture recognition system no longer generates any system output commands.

11. The system of claim 10, wherein the processor is further configured to generate an alert when the gesture recognition system is switched to the inactive mode.

12. The system of claim 10, wherein the processor is further configured to at least automatically generate the test response at a predetermined periodicity.

13. The system of claim 10, wherein the processor is further configured to receive a test initiation signal and, upon receipt thereof, generate the test response.

14. The system of claim 10, wherein:
the test target is configured to move; and
the test stimuli is movement of the test target.

15. The system of claim 14, wherein the test target moves periodically.

16. The system of claim 14, wherein the test target moves non-periodically.

17. The system of claim 10, wherein: the system is disposed in an aircraft; and the test target is an aircraft control surface actuator.

18. The system of claim 10, wherein:
the test target is stationary; and
the test stimulus is an optical stimulus.

* * * * *